V. HOPE

ELECTRIC FUSE OR CUT-OUT

Filed Nov. 21, 1922    7 Sheets-Sheet 1

INVENTOR:
VERNON HOPE.

By Spear, Middleton, Donaldson, Hall
Attys.

INVENTOR:
VERNON HOPE,
By Spear, Middleton, Donaldson, Hall
Attys.

ELECTRIC FUSE OR CUT-OUT

Filed Nov. 21, 1922     7 Sheets-Sheet 4

INVENTOR:
VERNON HOPE.
by Spear, Middleton, Donaldson & Hall
Attys.

ELECTRIC FUSE OR CUT-OUT

Filed Nov. 21, 1922    7 Sheets-Sheet 5

INVENTOR:
VERNON HOPE.
by Spear, Middleton, Donaldson & Hall.
Attys.

ELECTRIC FUSE OR CUT-OUT

Filed Nov. 21, 1922   7 Sheets-Sheet 6

INVENTOR:
VERNON HOPE.

UNITED STATES PATENT OFFICE.

VERNON HOPE, OF MACCLESFIELD, ENGLAND.

ELECTRIC FUSE OR CUT-OUT.

Application filed November 21, 1922, Serial No. 602,454, and in Great Britain November 28, 1921.

This invention relates to electric fuses or cut-outs of the enclosed or cartridge type, in which the fuse itself is embedded in a refractory powder contained in the cartridge, the cartridge being usually of tubular form and carrying the fuse contacts at the end of the tube so that the arrangement forms a convenient replacement fuse.

Such fuses usually satisfactorily clear the circuit for moderate overloads at moderate voltages, but are not satisfactory on direct short circuits at comparatively high voltages: and the object of the present invention is to improve this type of fuse in these respects and render it suitable for use in an earthed ironclad casing.

Attempts have been made to ventilate cartridge type fuses by providing openings at the ends, but when the fuse blows on a direct short circuit and an arc is struck, the rush of gases through these openings, which lead directly to the atmosphere in the vicinity of the fuse contacts, directs the arc to the contacts, and to the earthed metal casing in which the fuse is enclosed, and so damages the contacts and fuse fitting.

According to the present invention I provide an expansion chamber communicating through a suitable opening or openings with the interior of the cartridge or container in which the fuse and the powder in which it is packed are located. The openings are preferably arranged near the centre of the cartridge and may in one modification take the form of a belt of perforations at the centre of the cartridge, said belt being surrounded by a band of copper gauze or the like.

The expansion chamber may very conveniently be an annular chamber formed by surrounding the cartridge containing the refractory material by a tubular casing preferably of insulating material, the fuse contacts being carried on end plates fitting and closing the respective ends of the said outer casing.

In a fuse constructed in the manner described, using say zinc for the fuse, marble dust which has in part been calcined as the filling powder for the fuse containing cartridge, and asbestos wool or the like resilient end-filling for the cartridge, I find that neither the fuse casings nor terminals are damaged even when the fuse blows under a direct short circuit; it is possible therefore, with such construction, to provide a cartridge fuse of the enclosed type in which the fuse wire or strip is replaceable.

From very careful tests in which pressure recording devices have been employed, I have found in severe short-circuits with comparatively high voltages, when the openings leading from the container to the expansion chamber are covered by a band of copper gauze, as described, that considerable pressure may be generated in both the container and the expansion chamber, accompanied by sufficiently high temperatures at or near the said openings, to cause the burning of the copper bands; I further find that the copper gauze covering unduly restricts the egress of the powder and that under certain conditions a central channel is maintained in the container, in which the molten zinc is held, so that the time taken to clear the arc is prolonged, the result being further aggravated by the tendency of the powder to become compacted through heat and pressure.

It would appear that the high temperatures and pressures, particularly in the expansion chamber, are due to the passage through the said openings, of very high temperature zinc vapour, and to the combustion of this vapour as soon as it mixes with the air in the expansion chamber; with the object therefore of reducing to the minimum the amount of zinc volatilized, and of suppressing the combustion of that which is volatilized, I have devised means which, whilst they tend normally to retain the powder in the inner casing, shall, on the blowing of the fuse, permit the escape of the gases together with a proportion of the powder, from the central container through the openings into the expansion chamber, so that the mechanical damping action of the powder, as well as the chemical suppression which results from the formation of $CO_2$ prevents that degree of combustion which would result in the production of high pressures and temperatures.

I have found, as a result of my experiments, that the size of the openings in the wall of the container, leading from the interior of the latter to the expansion chamber, is a matter of some importance in securing adequate release of the gases without incurring the risk of too great a pressure in the expansion chamber.

The undesired rise of pressure in the expansion chamber, may to some extent be prevented by forming a comparatively large number of free holes of small diameter in the wall of the container at or near the central part of its length; if the holes are free and unobstructed they must be made small, for with comparatively large free holes considerable pressures are developed in the expansion chamber; for example, I have found in a 400 ampere fuse that eighteen holes each one thirty-second of an inch in diameter give good results, whereas with the same number of holes one-sixteenth of an inch in diameter very considerable pressures may, under some conditions of service, be developed.

I find that very much larger holes may be employed with the most excellent results, if, on the blowing of the fuse, the egress of the gases and powder be subjected to a preliminary check which is broken down when the pressure in the container tends to rise.

With multiple holes of the sizes described, there is no adequate provision to enable the powder in the container to collapse by partial escape through the holes, the area of the individual holes being apparently too small for this purpose. I therefore prefer, as an alternative, to provide for the release of the powder through fewer holes of larger size, rather than through numerous smaller holes, but to delay the escape of the powder by means which yield to pressure.

The action of the fuse may be considerably improved by substituting for the copper gauze described a means of closure for the openings, say of paper or thin fabric, which, whilst it is adapted to delay the escape of gases and powder from the container into the expansion chamber, yields to comparatively small pressure and affords, after what may be regarded as a short time-lag, a comparatively free exit for the gas and powder simultaneously.

I have found, for example, that three openings, each $\frac{5}{16}$ths of an inch diameter in the wall of the container, arranged on the same side of the container, near the centre of the length thereof give excellent results when the fuse blows under a severe short-circuit, if the openings be closed, say by a diaphragm of thin paper gummed or otherwise secured over the openings, or if they be closed by means of a split cylindrical metal clipping ring of such strength that it is forced away from the holes under a pressure not exceeding about 20 lbs. per square inch; but other equivalent closing means may obviously be employed.

The larger holes have the advantage that they allow the column of powder to collapse, with the result that the arc of the short-circuit is cleared much more rapidly than would otherwise be the case.

The size of the holes and the resistance of the closure means are matters which require to be considered, in accordance with the size and type of the fuse. The size of the holes and the means adopted to close them must be such that the delay in the escape of the gases shall ensure the effective operation of the powder, but shall not be sufficient to check the escape to such an extent that high pressures and temperatures result.

The escape of the powder through the holes into the expansion chamber with any volatilized zinc that may escape therewith is of advantage when the powder consists of marble dust part of which is calcined, inasmuch as $CO_2$ gas is generated, and this serves to suppress the combustion of the volatilized zinc which if it had free access to the air would take place in the expansion chamber with the accompaniment of high pressures and temperatures.

I have found, when comparatively large holes fitted with the closure means described are provided, that it is undesirable to fit such holes diametrically opposite each other; it is best to group them at or near the centre but on the same side. Where a split closure ring is fitted, the spring of the ring may be employed to cause engagement of shallow slots in the free ends of the ring with pins or pegs fixed to the container with the object of preventing accidental displacement, but other means for this purpose may be readily devised.

When marble dust alone is employed to suppress the combustion of the zinc vapour as described, $CO_2$ is produced at a pressure greater than is desirable, and I have found it of advantage to mix with the marble dust an inert powder which is neither fused nor decomposed under the conditions which obtain within the fuse casing; I further find that it is advantageous that the inert powder should be a heavy one, so that the chemical suppression of combustion by the $CO_2$ may be augmented by a mechanical smothering of the arc. Barium sulphate or keiselguhr are powders which when mixed with the marble dust have given excellent results, the mixture of barium sulphate and marble dust in approximately equal parts by volume being extremely effective.

In constructing a fuse embodying the improvements above described it is desirable that the several parts should be enclosed in a hermetically sealed enclosing casing within which latter, the expansion chamber is formed.

It is necessary, of course, to bring the fuse terminals out through the inner container and the enclosing casing, and this must be done in such manner as to reduce to a minimum any possible end leakage.

In each modification, the construction to permit of the re-wiring a blown fuse, should be such that the connection of the fuse wire or strip to its terminals and of the latter to the contact blades and end caps may, at one end at least, be made after the fuse has been inserted in the container and the latter packed with the filling powder. The container and the enclosing casing may as stated be made of fibre, but where an iron-clad construction is called for the outer casing may be of metal from which the contacts and interior parts are of course suitably insulated.

The most convenient arrangement for the expansion chamber is, as stated, that in which it is formed by an annular space between the container and the enclosing casing: it may, however, be formed in any other suitable manner provided that the openings in the container lead to the expansion chamber.

The openings in the container may be closed by a band of paper fixed round the container by a suitable adhesive, the paper coverings of the openings being arranged to burst when a desired container pressure is reached; preferably, however, they are enclosed by a split spring band sprung into place on the container, which band is preferably of an elastic metal, the band being wide enough to over-lap the openings, and the thickness being such as to permit the bands being displaced radially before the pressure to the container rises beyond a few pounds per square inch.

I have illustrated my invention in the accompanying drawings, in which:—

Figs. 7 to 11 show a modification in which the openings in the end, through which the fuse terminals pass are closed by conical nuts, Fig. 7 being an elevation; Fig. 8 an elevation in longitudinal section; Fig. 9 an end view; Fig. 10 a transverse section on the line X, X; Fig. 10^A an end view of the yielding cover and Fig. 11 a detail view of the fuse and terminals.

Figs. 12 to 16 show a modification of the arrangement of Figs. 7 to 11.

Figs. 17 to 22 illustrate a modification in which the fuse terminals form the contact blades of the fuse.

Figs. 23 to 28 show a modification in which the connection between the fuse and the end cap is made by internally arranged surfaces, Fig. 23 being an elevation; Fig. 25 an end elevation; Fig. 26^A is a detail of the yielding cover.

Figs. 29 to 35 illustrate a modification suitable for fuses of large carrying capacity.

Figs. 36 to 47 illustrate the preferred form of fuse for average current carrying capacities.

Figs. 40 to 47 are illustrations of details to smaller scale, Fig. 40 being a part plan view of the tubular shell of the fuse containing chamber, Fig. 41 an end view of the enclosing cap for the fuse containing chamber, Fig. 42 a transverse section of the elastic means for closing the opening in the fuse containing shell, Figs. 43 and 44 being respectively a corresponding elevation and plan.

Referring in the first instance to Figs. 1 to 6, which, as stated, are diagrammatic views, and in which A denotes the fuse containing chamber, B the expansion chamber, C the fuse, $c^1$ the means by which the fuse ends or terminals are carried gas-tight through the end of the casing, and $a^1$ the opening between the fuse container and the expansion chamber; the powder in which the fuse is embedded is indicated by the dotted cross-hatching.

Figure 1:
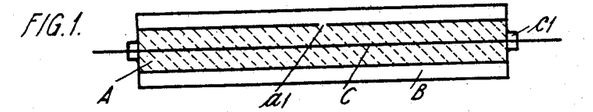
Figs. 1 to 6 are diagrammatic views showing various arrangements of the expansion chamber.
Figure 1A:
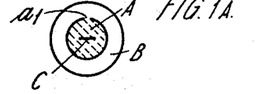
Figure 1B:
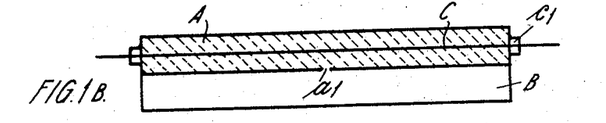
Figure 1C:
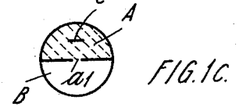

Figs. 1 and 1^A represent the preferred arrangement in which an annular space B between the exterior of the fuse container A and an outer tubular casing forms the expansion chamber. Figs. 1^B and 1^C show an arrangement in which the two chambers A and B are formed by a diameter division plate across the outer casing.

Figure 2:
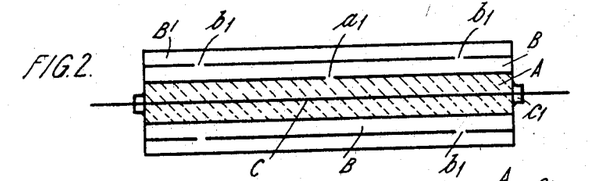
Figure 2A:
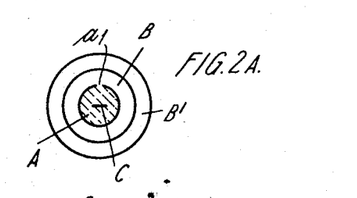
Figure 3:
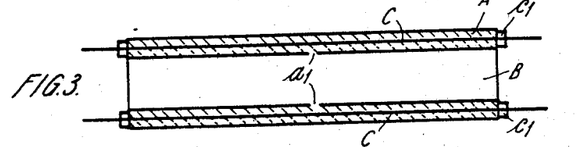
Figure 3A:
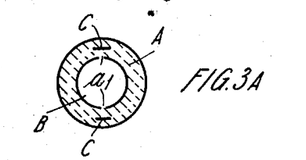
Figure 4:
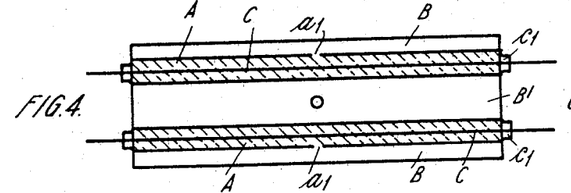
Figure 4A:
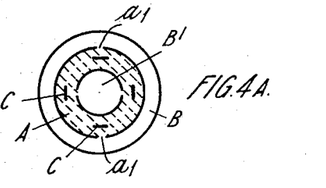
Figure 5:
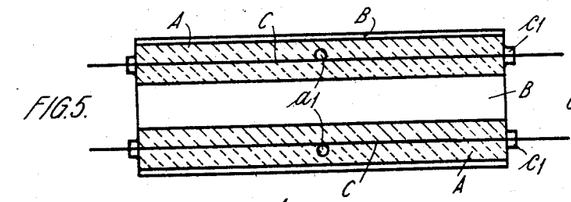
Figure 5A:
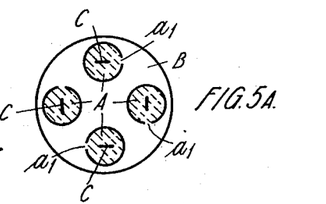

Figs. 2 and 2^A show a modification in which a secondary expansion chamber $B^1$ is formed outside the primary expansion chamber B, the latter opening into the former through openings $b^1$. In Figs. 3 and 3^A the expansion chamber B is formed in an inner tubular casing the fuse being located in the annular chamber A between this casing and an outer tubular casing. In Figs. 4 and 4^A the fuses are located in an annular space A and two expansion chambers are formed, one $B^1$ in a tubular casing within the fuse container and the other in the annular space B between the latter and an outer tubular casing. In Figs. 5 and $5^A$ multiple fuses are carried in several tubular casings A which are located within an enclosing tubular casing, the space between the exteriors of the casings A and an outer tubular casing forming a common expansion chamber B.

Figure 6:
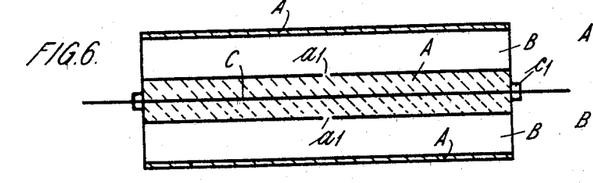
Figure 6A:
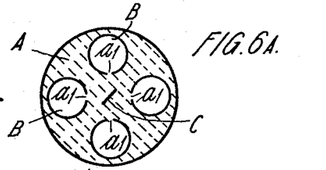
Figure 7:
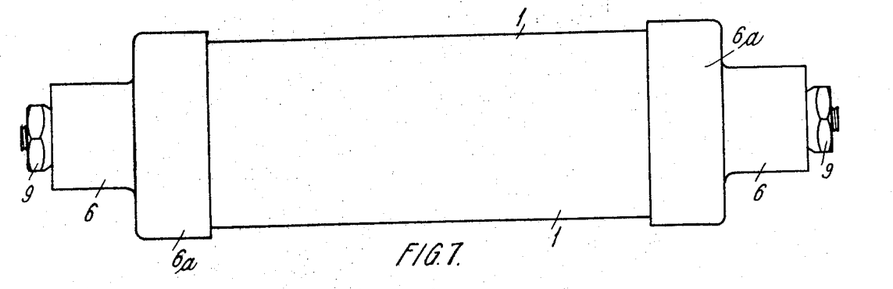
Figures 8, 9, 10, 10A:
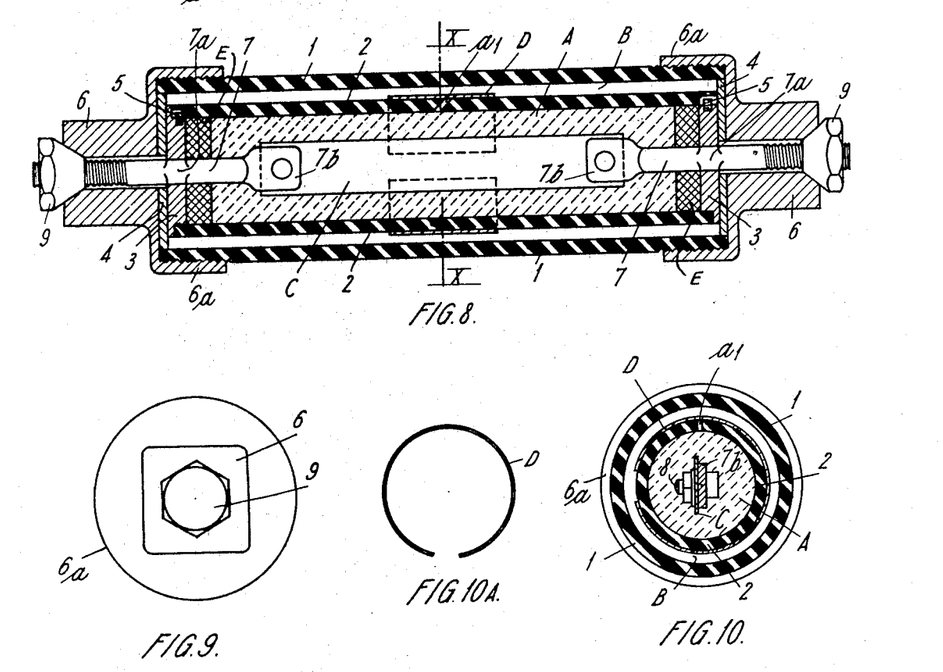
Figure 11:
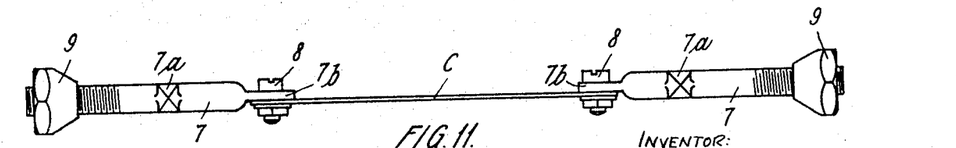
Figure 12:
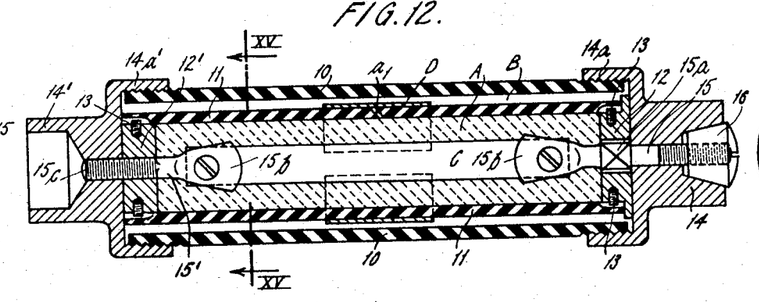
Fig. 12 being an elevation in longitudinal section.
Figure 13:
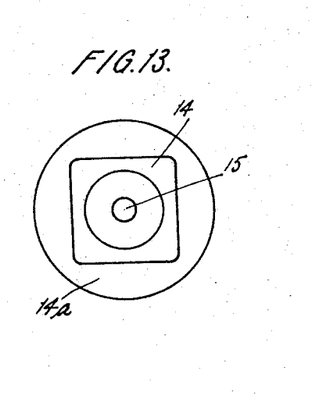
Fig. 13 an end elevation viewed from the left of Fig. 12.
Figure 14:
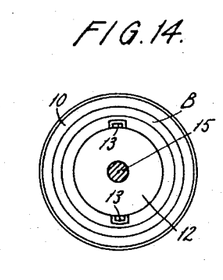
Fig. 14 an end view with the cap removed.
Figure 15:
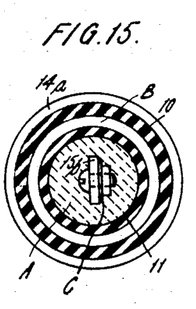
Fig. 15 a transverse section on the line XV.
Figure 16:
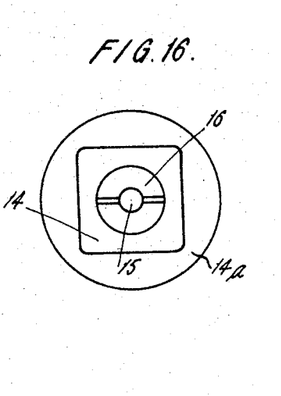
Fig. 16 an end elevation viewed from the right of Fig. 12.
Figure 17:
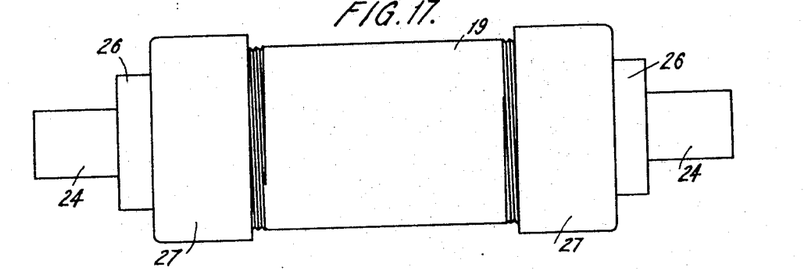
Fig. 17 being an outside elevation.
Figure 18:
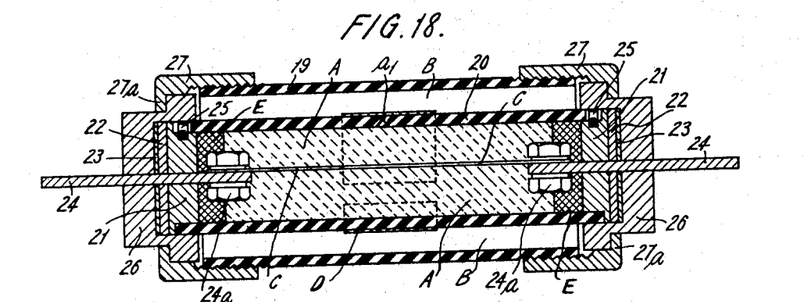
Fig. 18 an elevation in longitudinal section.
Figure 19:
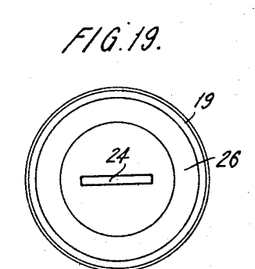
Fig. 19 an end view with the end cap removed.
Figure 20:
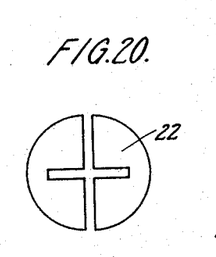
Fig. 20 a detail of one of the washers.
Figure 21:
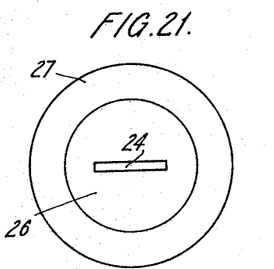
Fig. 21 an outside end view and Fig. 22 a detail of the fuse and its terminal blades.
Figure 22:
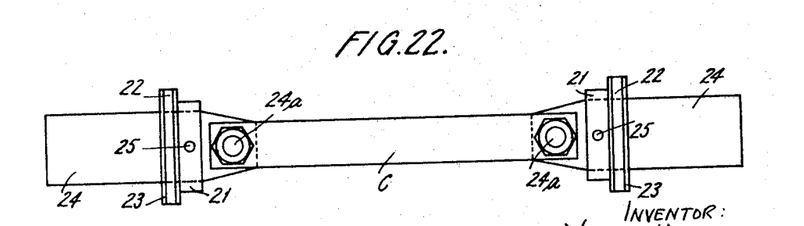
Figure 23:
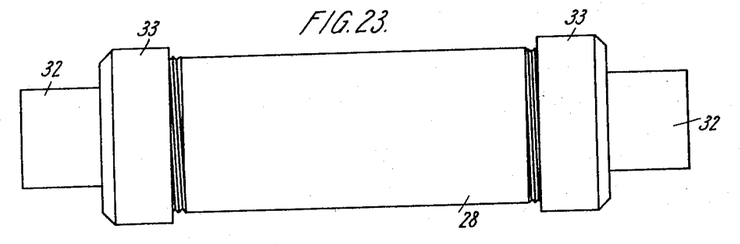

In Figs. 6 and $6^A$ multiple expansion chambers B are formed within a common fuse carrier chamber A.

There are, of course, other ways of forming the expansion chamber; it may, for instance, be formed at the ends of the fuse carrier, I find, however, that for practical reasons the latter construction is undesirable.

In each of the modifications shown in Figs. 1 to 6 A denotes the fuse container casing, B the expansion chamber, C the fuse, and $a^1$ the opening or openings between the fuse container and the expansion chamber, which openings are closed by the yielding closure member.

Referring now to Figs. 7 to 11:—

1 is the outer tubular casing, 2 an inner tubular casing forming the fuse container; the space between the two forming the expansion chamber; the ends of the inner chamber are closed by washers 3 which are prevented from turning relatively to the casing 2 by pins 5 fitting in recesses in the bore of the casing 2; the ends of the casing 1 are closed by washers 4, and the end joints are made by metallic end-caps 6 having internally screwed parts $6^a$, which screw on to screw-threaded portions at the ends of the casing 1. The fuse C is attached by bolts 8 to a facing $7^b$ on the fuse terminals 7 which pass through holes in the washers 3 and 4, and through the bore of the end cap 6, the portions $7^a$ which pass through the washers 3 being of square cross-section, and the ends being threaded; the end of the bore of the cap 6 is of conical configuration and a gas-tight joint is made therewith by the conical nuts 9. The portions 6 of the end caps are externally of square or other suitable cross-section, and they form the blades which fit into the contacts of the fuse. The holes $a^1$ are, in this modification closed by a spring ring D wide enough to considerably overlap the holes in an axial direction and flexible enough to yield and uncover the holes when the pressure in the fuse container A rises to a predetermined value, say, a few pounds above the atmosphere.

Referring now to Figs. 12 to 16:—

10 is the outer casing, 11 the inner casing, which latter is closed by end washers 12 and 12' fitted with pins 13 which engage with grooves in the bore of the casing 11; the terminal 15 has a squared portion $15^a$ fitting in the square bore of the washer 12, and it is screw threaded to take a cone-nut 16 which makes a gas-tight joint with the end cap 14. End cap 14' has a screwed part $14^{a'}$ which screws on to the casing 10 making a gas-tight joint therewith and a gas-tight joint between the washer 12' and the casing 11. The fuse is jointed to the flattened portion $15^b$ of the terminal $15^c$. The terminal $15^c$ screws directly into its end cap 14', and in this modification when a blown fuse is re-fused one terminal only needs to be detached from its end cap. D is the flexible closing means for the opening $a^1$ the construction of which is as described. The portions 14 and 14' of the end caps form the fuse blades as before.

Referring now to Figs. 17 to 22;—19 is the outer casing, 20 the inner casing, 21 the washer for closing the inner casing, 22 and 23 supplementary washers, 24 the end connections which in this modification take the form of rectangular blades passing out through rectangular openings in the washers 21, 22, 23 and in the cap 26 interposed between the washers and the flange $27^a$ of the end cap 27 which screws on to the outer casing 19 and makes the end joints. The fuse is secured to the blades 24 by bolts $24^a$ and the washer 21 is fitted with pins 25 as described. To facilitate assemblage the washers 21, 22 and 23 may be split as shown in reference to the washer 22 in Fig. 20. D is the flexible closure ring as before.

Referring to Figs. 23 to 28;—

Figure 24:
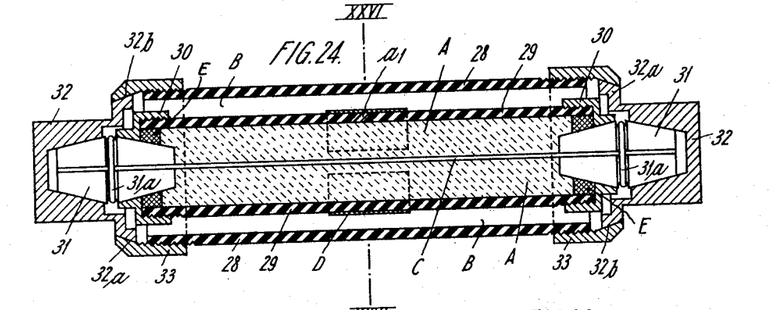
Fig. 24 a longitudinal section.
Figure 25:
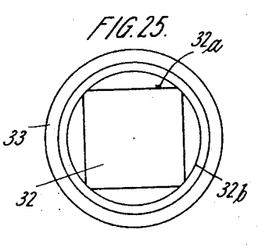
Figure 26:
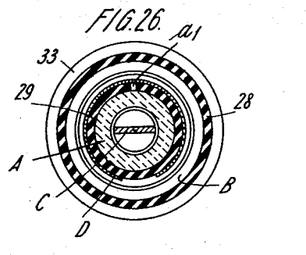
Fig. 26 a transverse section on the line XXVI.
Figure 26A:
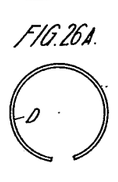
Figure 27:
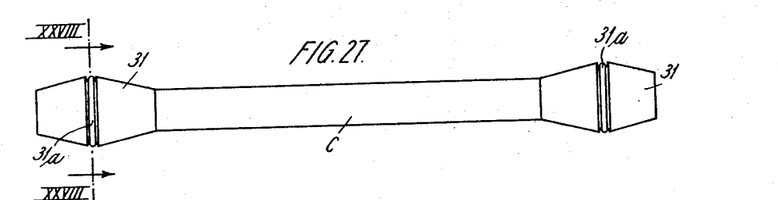
Fig. 27 a detail of the fuse and the cones.
Figure 28:
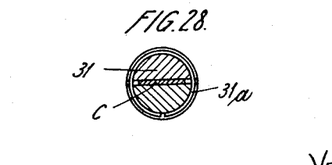
Fig. 28 a transverse section on the line XXVIII.
Figure 29:
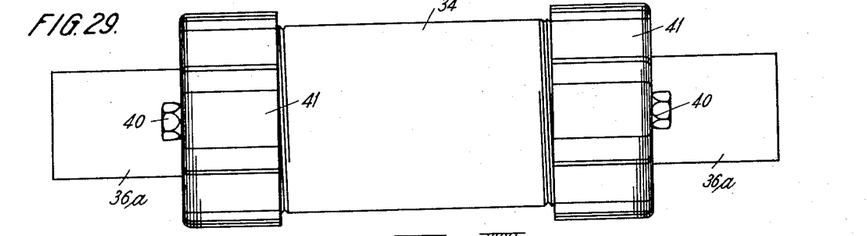
Fig. 29 being a side elevation, Fig. 30 a longitudinal section.
Figure 30:
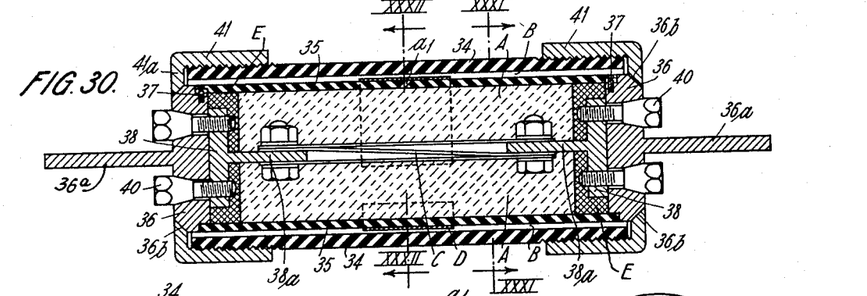
Figure 31:
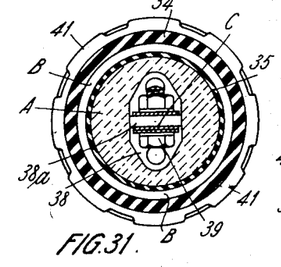
Fig. 31 a transverse section on the line XXXI.
Figure 32:
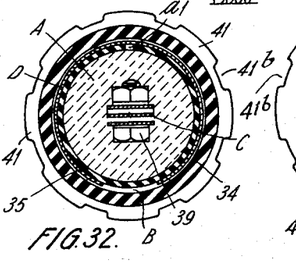
Fig. 32 a transverse section on the line XXXII.
Figure 33:
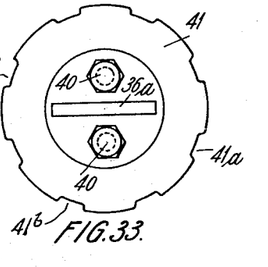
Fig. 33 an end elevation.
Figure 34:
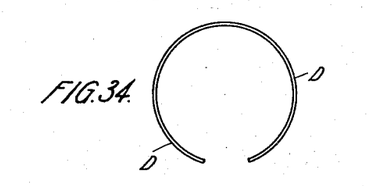
Fig. 34 an end view of the yielding cover.
Figure 35:
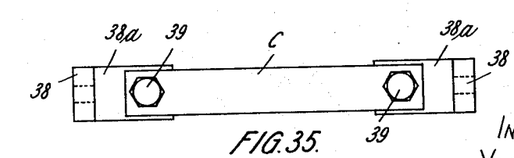
Fig. 35 a detail of the fuse and its end connections.
Figure 36:
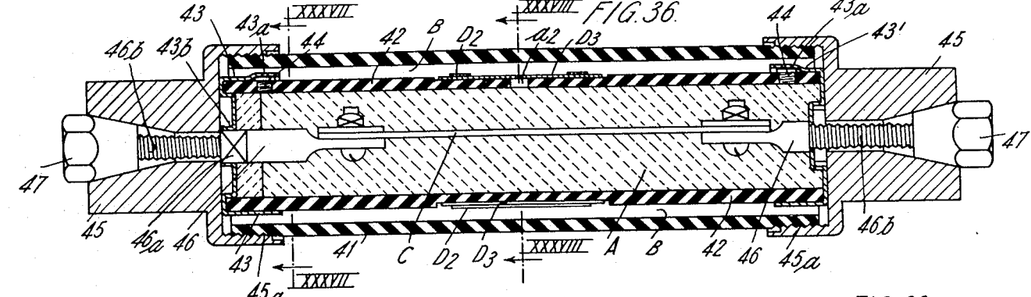
Fig. 36 being an elevation in longitudinal medial section, Fig. 37 a section on the line XXXVII, XXXVII of Fig. 36.
Figure 37:
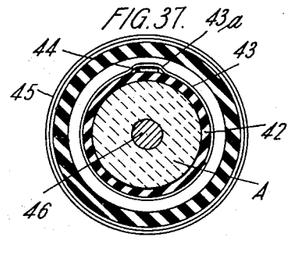
Figure 38:
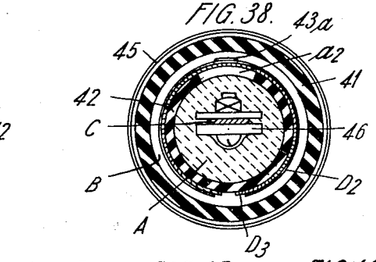
Fig. 38 a section on the line XXXVIII, XXXVIII of Fig. 36.
Figure 39:
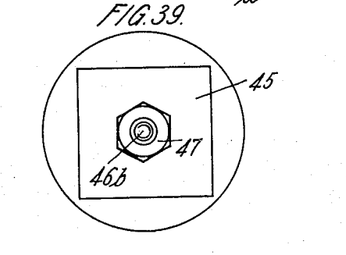
Fig. 39 is an end view.

28 is an outer casing; 29 the inner casing; 30 the end plates by which the inner casing is closed, which plates screw onto the inner casing 29 and have conical bores. A split double cone 31 embraces the fuse C, the two halves being held together by a flexible band $31^a$; one part of the double cone thus formed is a tight fit in a conical bore of the end 30, and the other end is a tight fit in a conical recess formed in the contact piece 32, the circular portion $32^a$ of which has a conical periphery $32^b$ with which a corresponding conical bore of the cap 33 makes joint. When the parts are assembled as shown in Fig. 24 and the screw caps 33 are screwed up, it will be seen that the ends of the fuse container and the expansion chamber are closed in gas-tight manner, and that the metallic coned plug 31 makes electrical connections between the fuse C and the metallic fuse blade 32, in this arrangement end terminals of the fuses are dispensed with. D is the flexible ring as described.

Referring now to Figs. 29 to 35; 34 is the outer casing; 35 the inner casing; 36 a metallic end washer which closes the inner casing, and which has a rectangular extension $36^a$ which forms the fuse blade and which is prevented from turning by the pins 37 which fit recesses in the interior of the casing 35; the joint between the washer 36 and the casing 35 being made by the end cap 41, the end of which has a conical bore 41ª which makes joint with the coned part 36ᵇ of the end washer 36, the cap screwing on to the screwed part of the casing 34 and being provided with indentations 41ᵇ to facilitate screwing up.

The ends of the fuses are bolted by bolts 39 to the ends 38ª of T shaped pieces 38, which latter make electrical contact with the ends 36, the joint being made by conical headed screws 40, screwing into the part 38. As before D is the flexible closure means.

Referring now to Figs. 36 to 47:—

41ª is the outer casing, 42 the inner tube, 43 and 43' the end caps by which the ends of the inner tube 42 are closed; this inner cap has a recess portion 43ª which fits over a screw 44 screwing into the tube 42 so as to prevent relative angular movement between 43 and 42.

The eye 43ᵇ of the cap 43 is square; 45 are combined terminal connections and end closing caps for the tube 41; each internally screwed at 45ª and the screw-threaded part fits on a screwed portion of the tube 41 which is made of insulating material. The caps 45 close the ends of the expansion chamber B and hold the caps 43 and 43' in position. 46 are the connectors by which the ends of the fuse are connected to the caps 45. The portion 46ª of the connectors 46 is of square configuration and slides in the square eyes 43ᵇ of the caps 43 so as to prevent relative angular movement between these parts. The portions 46ᵇ of the connectors are screwed and fitted with conical nuts 47 which screw into corresponding internal seatings in the terminal ports 45 and make gas-tight joint therewith.

Figure 40:
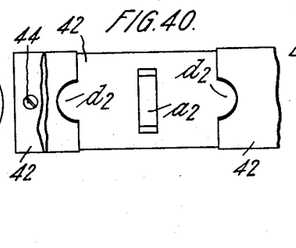
Figure 41:
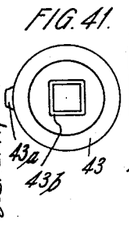
Figure 42:
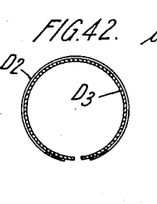
Figure 43:
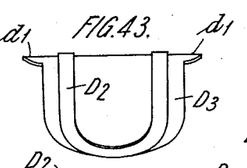
Figure 45:
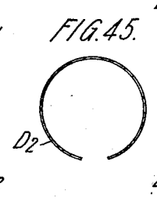
Fig. 45 is an end elevation, Fig. 46 a side elevation and Fig. 47 a plan of the elastic clip.
Figure 46:
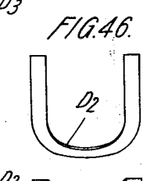
Figure 47:
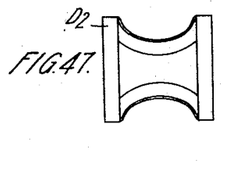

In this modification the opening $a^2$ in the wall of the tube 42 is rectangular in shape the longer axis being arranged circumferentially, the closing means comprise an elastic clip $D^2$ and an interposed saddle piece $D^3$ having projections $d^1$. The exterior of the tube 42 is recessed as shown in Fig. 40 and the saddle piece fits in the said recess and is thus located on the tubes axially, the projections $d^1$ fit corresponding recesses $d^2$ and prevent rotatable movement of the saddle piece. The clip $D^2$ which is shaped as shown in Figs. 45 to 47 is preferably of steel and it serves to clip the saddle $D^3$ in position on the tube 42. I find that advantage results from this mode of closing the opening $a^2$ in the tube 42. The saddle $D^3$ overlaps the opening $a^2$ considerably and thus provides the necessary initial check to the flow of gas and powder from the inner tube when the fuse blows. Whenever the pressure within the tube 42 rises the elastic member $D^2$ yields and the saddle is forced clear of the opening $a^2$, allowing the hot gases and powder to pass into the expansion chamber through the inlet space between the saddle $D^3$ and the tube 42, the powder escaping with the gas being heated and giving off a gas which tends to quench any flame that may result from the passing of the zone of the fusible element.

I have found that by the employment of the mode of closure of the opening between the inner tube and the expansion chamber by means of a spring clip such as D, and particularly by the employment of the mode of closure according to the modification last described, gives excellent results, particularly in regard to the prevention of undue rise of pressure within the fuse container or expansion chamber when the fuse blows; this I believe to be due to the extent of contact area between the clip D or the saddle $D^3$ and the portion of the tube 42 surrounding the opening $a^2$.

The saddle $D^3$ and the clip $D^2$ are the most effective means known to me for ensuring an initial check to the outflow of gas and powder whilst permitting, when the pressure in the fuse container chamber rises, comparatively free outflow of the gas and powder. Obviously other means may be employed for effecting the closure of the opening between the fuse container chamber and the expansion chamber and the best results will be obtained if due regard be given to the following considerations;—a single opening of the necessary area usually gives better results than a number of smaller openings of equal aggregate area; and a rectangular opening at the centre of the length of the fuse container chamber with its longer axis arranged circumferentially gives excellent results. I further find that the best results are obtained when zinc is used as the fusible element and when the powder is composed of powdered marble and barium salts in the proportions mentioned.

In each of the modifications the parts which carry current are of course made of high conductivity metal; the end caps which screw on to the outer tubular casing are also metallic; but the other portions are generally made of insulating material, good quality vulcanized fibre being found suitable; the closure rings D are preferably made of steel.

In some cases it may be desirable that the outer container should be of metal, in this case a metal tube instead of a fibre is employed, care being taken to effectively insulate the metallic casing from any metallic portions which carries current.

In the claims where the term "incombustible material" is used, any gaseous liquid or solid substance which is non-combustible is meant.

Having now fully described my invention, I declare that what I claim and desire to secure by Letters Patent is:—

1. In an enclosed electric fuse; in combination;—a fuse containing chamber, a fusible element enclosed in said chamber, an incombustible material surrounding the fusible element and enclosed in said chamber, conducting terminals connected to the respective two ends of the fusible element and passing out of the said chamber in gas-tight manner, an expansion chamber, a communicating passage-way between the said chambers and means adapted to close the said passageway and adapted, when the pressure in the fuse containing chamber reaches a predetermined value, to open the said passage-way.

2. In an enclosed electric fuse, an inner tube forming a fuse containing chamber, means for closing the ends of the inner tube, a fusible element enclosed in the said inner tube, conducting terminals passing gas-tight through the ends of the inner tube, an incombustible material surrounding the fusible element and enclosed in the inner tube, an outer tube, an expansion chamber bounded by the inner wall of the outer tube and the outer wall of the inner tube, means for closing the ends of the expansion chamber, communicating means between the chambers formed in the wall of the inner tube and axially adjustable end-caps attached to the ends of the outer tube and adapted to hold the end closing means of the chambers in position at the ends of the tubes.

3. In an enclosed electric fuse, an inner tube forming a fuse containing chamber, a fusible element enclosed in the said inner tube, conducting terminals passing gas-tight through the ends of the inner tube, an incombustible material surrounding the fusible element and enclosed in the inner tube, an outer tube of insulating material an expansion chamber bounded by the inner wall of the outer tube and the outer wall of the inner tube, communicating means between the chambers formed in the wall of the inner tube, axially adjustable chamber-closing ends made of conducting material attached to the outer tube of insulating material and forming end terminal connections for the fuse connecting means adapted to connect the ends of the fusible element to the respective chamber-closing ends comprising a screw threaded member passing through the said chamber-closing ends and being fitted with coned nuts making gas-tight joint with coned seatings in said ends.

4. In an enclosed electric fuse, an inner tube forming a fuse containing chamber, a fusible element enclosed in the said inner tube, conducting terminals passing gas-tight through the ends of the inner tube, an incombustible material surrounding the fusible element and enclosed in the inner tube, an outer tube of insulating material an expansion chamber bounded by the inner wall of the outer tube and the outer wall of the inner tube, communicating means between the chambers formed in the wall of the inner tube end caps adapted to close the ends of the inner tube and held against rotation therein, end caps made of conducting material adapted to screw on to the screwed ends of the outer tube and to close the ends of the latter and retain the ends of the inner tube in position and to form terminal connections for the fuse; connecting means, adapted to connect the ends of the fusible element to the said terminal connections, and comprising a screw threaded member passing through the inner tube end covers and held against rotation relatively thereto, and passing through the end terminal connections and being fitted with coned nuts adapted to make gas-tight joints with coned seatings in the said terminal connections.

5. In an inclosed electric fuse; in combination, a fuse containing chamber, a fusible element inclosed in said chamber, an incombustible material surrounding the fusible element and inclosed in said chamber, conducting terminals connected to the respective two ends of the fusible element and passing out of the said chamber in gas tight manner, and an expansion chamber communicating with the fuse containing chamber, in which the incombustible material surrounding the fusible element and enclosed in the fuse containing chamber is a material composed of approximately equal parts of powdered marble and barium sulphate.

6. In an enclosed electric fuse in combination with a tubular fuse-containing chamber, a fusible element enclosed therein, an incombustible material surrounding the fusible element and enclosed in said chamber, conducting terminals passing in gas-tight manner out of the ends of the said chamber, an expansion chamber surrounding the said fuse containing chamber, a communicating passage-way between the chambers formed in the wall of the fuse containing chamber and means for closing the said opening comprising a flexible clip externally gripping the fuse containing chamber and adapted when a predetermined pressure is reached in the said chamber, to release the closing means and permit the opening of the said communicating passage-way.

7. In an enclosed electric fuse, in combination, a tubular fuse containing chamber, a fusible element enclosed therein, an incombustible material surrounding the fusible element and enclosed in said chamber, conducting terminals passing in gas-tight manner out of the ends of said chamber, an expansion chamber surrounding the said fuse containing chamber, a communicating opening between the fuse containing and expansion chambers, a saddle-like clip closing the said opening with considerable overlap and an elastic clip encircling the enclosing clip and holding the latter in position.

8. In an enclosed electric fuse as claimed in claim 7, constructing the metal clip of strip metal bent to form an encircling elastic frame adapted to press the closing clip into contact with the surface of the fuse containing chamber.

9. In an enclosed electric fuse as claimed in claim 7, forming an indentation on the exterior of the fuse containing chamber into which indentation the closing clip fits and by which it is retained in position axially in the said recessed part, and end projections on the enclosing clip engaging with the said recess.

10. The improvement in enclosed electric fuses which consists in enclosing a fusible element of zinc in a fuse containing chamber through the ends of which the terminal connections pass in gas-tight manner, said chamber being packed with a powdered incombustible material which on being heated gives off a gas which smothers the arc formed when the fuse blows, and in providing a gas-tight expansion chamber connected by communicating means with the interior of the fuse containing chamber, said communicating means being intially closed by yielding means which open when the pressure in the fuse containing chamber rises beyond a predetermined pressure.

In witness whereof I set my hand.

VERNON HOPE.